United States Patent [19]

Maddox, Jr. et al.

[11] 4,008,165
[45] Feb. 15, 1977

[54] SURFACTANT OIL RECOVERY PROCESS USABLE IN HIGH TEMPERATURE FORMATIONS HAVING HIGH CONCENTRATIONS OF POLYVALENT IONS

[75] Inventors: Jim Maddox, Jr.; Jack F. Tate, both of Houston, Tex.

[73] Assignee: Texaco Inc., New York, N.Y.

[22] Filed: July 7, 1975

[21] Appl. No.: 593,394

Related U.S. Application Data

[62] Division of Ser. No. 558,404, March 14, 1975, Pat. No. 3,939,911.

[52] U.S. Cl. .......... 252 355; 252/8.55 D; 166/274; 252/8.55 B; 252/180
[51] Int. Cl.² ......................................... E21B 43/22
[58] Field of Search ................. 252/8.55 D, 8.55 B, 252/545, DIG. 7, DIG. 17; 166/273, 274, 275; 252/180

[56] References Cited

UNITED STATES PATENTS

| | | | |
|---|---|---|---|
| 3,004,056 | 10/1961 | Nunn et al. | 252/89 X |
| 3,280,179 | 10/1966 | Ernst | 260/501.12 |
| 3,724,544 | 4/1973 | Tate | 166/275 X |
| 3,811,505 | 5/1974 | Flournoy et al. | 166/274 |
| 3,811,507 | 5/1974 | Flournoy et al. | 166/274 |
| 3,827,497 | 8/1974 | Dycus et al. | 252/8.55 X |

Primary Examiner—Herbert B. Guynn
Attorney, Agent, or Firm—T. H. Whaley; C. G. Ries; Jack H. Park

[57] ABSTRACT

A three surfactant system usable in high temperature petroleum formations containing water having from about 200 to about 14,000 parts per million polyvalent ions such as calcium and/or magnesium dissolved therein and a pH of from 5 to 9, and a method of using said surfactant system for recovering petroleum from high temperature subterranean petroleum-containing formations. The three component surfactant system comprises (1) water-soluble salt of an alkyl or alkylaryl sulfonate wherein the alkyl chain may have from 5 to 25 carbon atoms, (2) a phosphate ester surfactant with an average molecular weight not to exceed 1000, and (3) a surfactant having the following betaine related structure:

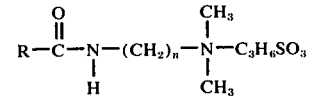

wherein R is an alkyl group having from 12 to 24 carbon atoms, and $n$ is an integer from one to five. The surfactant combination is stable up to at least 225° F and resistant to bacterial attack and inhibits scale formation.

6 Claims, No Drawings

SURFACTANT OIL RECOVERY PROCESS USABLE IN HIGH TEMPERATURE FORMATIONS HAVING HIGH CONCENTRATIONS OF POLYVALENT IONS

This is a division of application Ser. No. 558,404 filed Mar. 14, 1975, now U.S. Pat. No. 3,939,911.

BACKGROUND OF THE INVENTION

1. Field of the Invention

This invention relates to a method for recovering petroleum from subterranean petroleum-containing formations, and more particularly to a surfactant flooding method for recovering petroleum from high temperature subterranean petroleum-containing formations. Still more particularly, this invention pertains to a novel surfactant mixture which resists bacterial attack and functions effectively in high temperature formations containing water having high polyvalent ion concentrations, e.g., high calcium or magnesium concentrations, which cause precipitation of conventional surfactants, and to a method for using such novel surfactant composition in a surfactant flooding process for recovering petroleum.

2. Description of the Prior Art

Petroleum is normally recovered from subterranean formations in which it has accumulated by penetrating said formation with one or more wells and pumping or permitting the petroleum to flow to the surface through these wells. Recovery of petroleum from petroleum-containing formations is possible only if certain conditions exist. There must be an adequate amount of petroleum in the formation, and there must be sufficient porosity and permeability or interconnected flow channels throughout the formation to permit the flow of fluids therethrough if sufficient pressure is applied to the fluid. When the subterranean petroleum-containing formation has natural energy present in the form of an underlying active water drive, or gas dissolved in the petroleum which can exert sufficient pressure to drive the petroleum to the producing well, or a high pressure gas cap above the petroleum within the petroleum reservoir, this natural energy is utilized to recover petroleum. Recovery of petroleum by utilizing natural energy is referred to as primary recovery. When the natural energy source is depleted, or in the instance of those formations which do not originally contain sufficient natural energy to permit primary recovery operations, some form of supplemental recovery process must be applied to the formation of extract additional petroleum. Supplemental recovery is frequently referred to as secondary or tertiary recovery, although in fact it may be primary, secondary or tertiary in sequence of employment.

Water flooding, commonly referred to as secondary recovery, involves the injection of water into the subterranean, petroliferous formation for the purpose of displacing petroleum toward the producing well. This is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U.S. Pat. No. 2,233,381 (1941) disclosed the use of polyglycol ether as a surface-active agent or surfactant to increase the capillary displacement efficiency of an aqueous flooding medium. U.S. Pat. No. 3,302,713 and U.S. Pat. No. 3,468,377 (1969) describe the use of petroleum sulfonates for oil recovery. Other surfactants which have been proposed for oil recovery include alkyl sulfates and alkyl or alkylaryl sulfonates.

The above described surfactants are satisfactory for surfactant flooding in petroliferous formations only if the calcium and magnesium concentration of the formation water is below about 500 parts per million. Petroleum sulfonate is a popular and desirable surfactant because of its high surface-activity and low unit cost, although it also suffers from the limitation that it can be used only when the total formation water hardness (calcium + magnesium) is less than about 500 parts per million. If the formation water calcium and/or magnesium content exceeds about 500 parts per million, petroleum sulfonates precipitate rendering them inoperative for oil recovery and in some instances causing plugging of the formation.

Many subterranean petroleum-containing formations are known to exist which contain polyvalent ions such as magnesium and calcium in concentrations far in excess of 500 parts per million. The most common of such reservoirs are limestone formations which may have polyvalent ion concentrations from 200 to as high as 20,000 parts per million in the original connate water, and the formation water, after the formation has been subjected to flooding with fresh water, may have concentrations of calcium and/or magnesium from about 500 to about 15,000 parts per million. Since many surfactants taught in the art as being usable for oil recovery operations precipitate when exposed to aqueous environments having a total hardness in excess of about 500 parts per million, such surfactants cannot be used in limestone reservoirs. If an aqueous solution of petroleum sulfonate, for example, were injected into a limestone reservoir, the petroleum sulfonate would percipitate on contacting the high calcium-containing formation water. In such a process, the flood water would have essentially no surfactant present in it to decrease the interfacial tension between water and petroleum. Furthermore, precipitated petroleum sulfonate plugs small flow channels in subterranean, petroleum-containing formations decreasing the formation porosity and injectivity, thereby causing a substantial decrease in the oil displacement efficiency.

In U.S. Pat. No. 3,508,612, J. Reisberg et al, 1970, an oil recovery method employing a mixture of sulfonates, specifically petroleum sulfonates and sulfated ethoxylated alcohol is disclosed which results in improved oil recovery in the presence of high concentrations of polyvalent ions including calcium. Field application of petroleum sulfonate has revealed numerous problems associated with the heterogeneous nature of the oleophilic moieties present, however. Specifically in a paper presented at the Society of Petroleum Engineers, Fall 1972, meeting held in San Antonio, the problem of fractionation of the petroleum sulfonate surfactant was noted. The paper, SPE 4084, is titled "Borregas Surfactant Pilot Test" by Messrs. S. A. Pursley and H. L. Graham. In the paper it is stated that "The higher equivalent weight materials were selectively absorbed on the mineral surfaces of the rock" and "the higher equivalent weight portions of the [petroleum sulfonate] surfactant are the prime contributors to low interfacial tensions that permit mobilization of residual oil." Thus a unique problem is recognized in the use of petroleum sulfonate in that the most effective portion of petroleum sulfonate are selectively removed from aqueous solution by adsorption on the rock surface and/or partitioning into the oil phase.

The Reisberg patent states that a concentration lower limit of one percent surfactant is mandatory. Our surfactant combination may be used very effectively at a much lower concentration.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not be economically feasible for several reasons. Nonionic surfactants are not as effective on a per unit weight basis as are the more commonly used anionic surfactants, and furthermore, the nonionic surfactants have a higher cost per unit weight than do the anionic surfactants. Moreover, polyethoxylated alkyl phenol nonionic surfactants exhibit a reverse solubility relationship with temperature and become insoluble at temperatures in the range of 125° F, making them ineffective in many oil formations. Other types of nonionic surfactants hydrolyze at temperatures above about 165° F.

The use of certain combinations of anionic and nonionic surfactant to combat hard water formations is also taught in the art. For example, U.S. Pat. No. 3,811,505 discloses the use of alkyl or alkylaryl sulfonates or phosphates and polyethoxylated alkyl phenols; U.S. Pat. No. 3,811,504 teaches the use of three component mixture including an alkyl or alkylaryl sulfonate, an alkyl polyethoxy sulfate and a polyethoxylated alkyl phenol; and U.S. Pat. No. 3,811,507 teaches the use of a water soluble salt of a linear alkyl or alkylaryl sulfonate and a polyethoxylated alkyl sulfate.

The pH of the formation water is also a factor which affects the operability of the surfactant flood. The surfactant should be effective at the pH of the formation water.

Other problems encountered in surfactant flooding operations of the type taught in the prior art include susceptibility of the surfactant to bacterial degradation in the formation, and serious scale deposition in the production well through which formation fluids and previously injected aqueous fluids are produced to the surface of the earth.

The use of the phosphate ester surfactant described more fully hereinafter below is taught in U.S. Pat. No. 3,488,289 as a scale inhibitor.

Thus it can be seen that while many surfactants have been proposed for supplemental oil recovery use, there is a substantial, unfulfilled need for a surfactant composition usable in formation water containing calcium and/or magnesium in excess of 500 parts per million in formations hotter than 125° F which are effective over a broad pH range. There is an especially serious need for a surfactant system with the foregoing properties which is additionally resistant to bacterial degradation in the formation.

SUMMARY OF THE INVENTION

This invention pertains to a novel three component surfactant system and to a method for recovering petroleum from subterranean petroleum-containing formations using said surfactant system, said petroleum-containing formation having a temperature greater than 125° F and also containing water having a polyvalent ion content, for example calcium and/or magnesium, in the range of from about 200 to about 14,000 parts per million and a pH from 5 to 9. The novel surfactant system is an aqueous solution containing at least three components: (1) from about 0.05 to about 5.0 percent by weight of an anionic surfactant which is a water-soluble salt of an alkyl or alkylaryl sulfonate, such as, for example, sodium dodecylbenzene sulfonate. (2) From about 0.05 to about 5.0 percent by weight of a phosphate ester surfactant containing alkyl or arylalkyl groups. (3) From about 0.05 to about 5.0 percent of a sulfonated, betaine-related compound having the following structure:

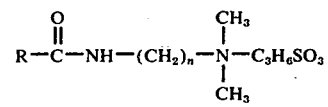

wherein R is $C_{12}$ to $C_{24}$ and $n$ is from one to five. From about 2 percent pore volume to about 50 percent pore volume of the surfactant solution is injected into the formation. The surfactant solution may be displaced through the formation by injecting water, or it may be followed immediately by a quantity of thickened water such as is formed by mixing a small amount of a hydrophilic polymer such as polyacrylamide or polysaccharide in water to increase its viscosity, which is in turn displaced through the formation with water. One or more slugs of gas may be injected into the formation after or in lieu of the hydrophilic polymer solution. The three component surfactant system is compatible with from about 500 to about 14,000 parts per million calcium and/or magnesium, operates in a pH range from 5 to 9, is stable up to at least 225° F and additionally, the phosphate ester inhibits scale desposition in the production well. Our invention therefore incorporates the novel three surfactant system, and the method of using said surfactant system for the recovery of petroleum from subterranean, high temperature petroleum-containing formations having a polyvalent ion concentration in the formation water from about 500 to about 14,000 parts per million and a pH range from about 5 to about 9.0.

DESCRIPTION OF THE PREFERRED EMBODIMENTS

This invention concerns a novel, multiple surfactant system which can be used in subterranean petroleum-containing formations which formations also contain "hard water", or water having polyvalent ions such as calcium and/or magnesium dissolved therein in a concentration of from about 200 to about 14,000 parts per million. There are many petroleum-containing formations which contain water having calcium and/or magnesium concentrations in the range from about 200 to about 14,000 parts per million; the most common of such formations being limestone formations. These formations frequently contain a substantial amount of petroleum after primary production and even after water flooding, but surfactant flooding cannot be employed in them because surfactants previously proposed for oil recovery are insoluble or otherwise ineffective in the presence of calcium and/or magnesium in the range of from 200 to 14,000 parts per million. In addition, the surfactants are thermally stable in solution up to temperatures of at least 225° F, neither becoming insoluble nor hydrolyzing.

The combination of thermal stability and divalent ion tolerance is unique, since many surfactants are either thermally stable but intolerant to divalent ions or tolerant of divalent ions but either decompose as by hydrolysis, or become insoluble at temperatures over 125° F. Moreover, the combination of thermal stability and divalent ion tolerance is quite valuable since many oil formations are at a temperature over 125° F and contain water having divalent ions dissolved therein in excess of 500 parts per million.

We have found that an aqueous solution of three surfactant materials, in a critical concentration range, will effectively reduce the interfacial tension between oil and water, and will function effectively in the presence of calcium and magnesium in a concentration of from about 200 to about 14,000 parts per million total hardness and over a fairly broad pH range, from about 5 to about 9. The three surfactant system comprises:

1. A sulfonated surfactant with average molecular weight not to exceed about 360 having one of the following general formulas:

$$[R - X]\, Y \tag{a}$$

wherein R is an alkyl radical, linear or branched, having from 5 to 25 and preferably from 8 to 14 carbon atoms, X is an oxygen containing anionic radical, preferably a sulfonate ($SO_3$), and Y is a monovalent cation such as sodium, potassium or ammonium, or

(b)

wherein R, X and Y have the same meaning as above. For example, if R is linear dodecyl, X is sulfonate and Y is ammonium, the material is ammonium dodecylbenzene sulfonate.

2. A phosphate ester surfactant with average molecular weight not to exceed 1000 having the general formula

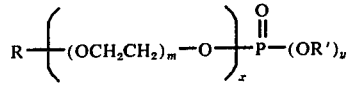

wherein R is an alkylphenyl or an alkyl radical, linear or branched, having from 12 to 24 carbon atoms, $m$ is an integer between 1 and 20, both $x$ and $y$ are 1 or 2 and the sum of $x$ and $y$ is 3 and R' is hydrogen, sodium, potassium or ammonium.

3. A surfactant having the following structure:

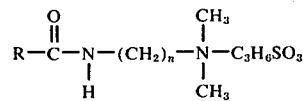

wherein R is an alkyl group having from 12 to 24 carbon atoms and $n$ is an integer from one to five. A specific example of such a compound is Sulfobetaine CA manufactured by Textilana Corporation, Hawthorne, California. Sulfobetaine CA is described by Textilana as an acyl amido ammonium sulfonic acid betaine.

All of the above surfactant materials are individually known in the art as having surface-active properties and available commercially from surfactant manufacturers.

Neither the alkylaryl sulfonate nor the phosphate ester surfactant is suitable for use alone in oil formations such as those described herein, specifically in the presence of more than 200 parts per million calcium, but surprisingly the two materials together exhibit excellent performance over a broad divalent ion concentration range. The sulfonated substituted betaine expands the pH tolerance of the alkylaryl sulfonate and phosphate ester combination and imparts resistance to bacterial degradation.

The term surfactant encompasses a broad spectrum of materials which share the following common characteristics:

1. The compound must be at least slightly soluble in at least one phase of a liquid system,
2. The compound must have an amphipathic structure (the molecule is composed of groups with opposing solubility tendencies). For use in oil recovery operations, the molecule must have at least one hydrophobic or oil-soluble group and at least one hydrophilic or water-soluble group.
3. The surfactant molecules or ions must form oriented monolayers at phase interfaces.
4. The equilibrium concentration of the surfactant in any particular solute at the phase interface is greater than the concentration of the surfactant in the bulk of the solution.
5. The material must tend to form micelles or aggregates of molecules or ions whenever the concentration exceeds a certain limiting value which is a characteristic of the particular surfactant and solute.
6. The material must exhibit some combination of the following functional properties: detergency, foaming, wetting, emulsifying, solubilizing and dispersing.

Surfactants are generally classified on the basis of the type of hydrophilic or water-soluble group or groups attached to the molecule, generally being classified as anonic, cationic, or nonionic, as described below more fully.

1. Anionic surfactants are those surfactant materials wherein the hydrophilic or water-soluble group is a carboxylate, sulfonate, sulfate or phosphate group. This is the most important class of surfactants. Anionic surfactants are readily available, inexpensive, and have a high degree of surface activity. Petroleum recovery operations will generally involve the use of anionic surfactants unless there is some objection to the use of anionic surfactants, or some sufficient reason to resort to the use of some other compound. Pertroleum sulfonates are currently very popular anionic surfactant for oil recovery, and are prepared by isolating a preselected boiling range fraction of a crude oil and subjecting it to sulfonation. Although this material is desirable for use because of its low unit cost, there are problems associated with the use of petroleum sulfonates because of the complex nature of the hydrophobic or oil-soluble portion of the molecule, as well as the limited tolerance for calcium and magnesium. Consequently petroleum sulfonates are not preferred for use in our invention.

2. Cationic surfactants employ primary, secondary, or tertiary amines, or quaternary ammonium groups, as the hydrophilic or water-soluble group.

3. Nonionic surfactants are materials which have no charge when the material is dissolved in an aqueous medium. The hydrophilic tendency is derived from oxyen atoms in the molecule which hydrate by hydrogen bonding to water molecules present in the solute. The strongest hydrophilic moiety in this class of surfactants is the ether linkage, and there must be a plurality of these linkages present to render the compounds sufficiently water soluble to permit the compound to exhibit surface activity. Polyoxyethylene surfactants having the following recurring ether linkages are examples or hydrophilic moieties for nonionic surfactants:

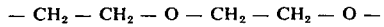

A nonionic surfactant molecule may have more than one chain containing ether linkages and generally as much as 30 to 50 percent by weight of the molecule must be in the form of ether linkage containing chains in order to render the molecule sufficiently water soluble for it to function as a surfactant. It can be readily seen that the pressure of these large chains containing the ether linkages in addition to the relatively long aliphatic or other hydrophobic chains results in a high molecular weight compound, and this is one reason that nonionic surfactants have a low surface activity per unit weight of material.

Nonionic surfactants are more efficient in the presence of high concentrations of calcium and magnesium than are either anionic or cationic surfactants, and it is possible to conduct a surfactant flood operation in a subterranean limestone formation or other subterranean petroleum-containing formation wherein the formation water contains substantial quantities of calcium and/or magnesium, about 200 parts per million, although they cannot tolerate calcium and/or magnesium levels of the upper part of the hardness range encountered in limestone formations. Nonionic surfactants are also not particularly desirable for use as the sole surfactant because of their high cost per unit weight, low surface activity per unit weight, and at least in the case of certain polyethoxylated alkyl phenols, their tendency to become insoluble at temperatures above about 100°–150° F.

The optimum concentration of each material which constitutes the novel surfactant system of our invention will vary to a degree depending on the hardness, pH and other characteristics of the aqueous environment in which it is to be used. Ideally, this should be determined by test utilizing the actual formation water in which the material will be used. Generally from about 0.05 percent to about 5.0 percent and preferably from about 0.2 to about 0.5 percent by weight of each of the three components will be effective within the 200 to 14,000 parts per million hardness range of the aqueous environment.

The surfactant solution is advantageously prepared in field water, generally a low gravity brine. Moreover, it is preferable that the surfactant solution contain divalent ions in about the same range as the formation water if the surfactant mixture can be tailored to yield optimum results at that concentration. Similarly, the pH of the surfactant solution should match the pH of the formation water.

Ideally, the optimum concentration of each of the surfactants should be determined experimentally for each application, since the optimum ratio of the three surfactants will depend on several factors but particularly on the pH and calcium and magnesium concentration of the formation water in which they will be used. As a general rule, higher concentrations of the second surfactant, the phosphate ester, are preferred in use in water having polyvalent ion concentrations within the higher portions of the stated divalent ion concentration range, and relatively larger amounts of the sulfonated betaine are needed for lower pH waters.

In the practice of our invention, from about 2 to about 50 pore volume percent of an aqueous solution containing from about 0.05 to about 5.0 percent and preferably from about 0.2 to about .8 percent of a sulfonated surfactant and from about 0.05 to about 5.0 percent and preferably from about 0.2 to about 0.8 percent by weight of the phosphate ester surfactant, and from about 0.05 to about 5.0 and preferably from about 0.2 to 0.8 percent by weight of the sulfonated betaine is injected into the subterranean petroleum-containing formation. The subterranean petroleum-containing formation to which this invention will be applied may be a limestone formation, or any formation having water containing from about 500 to about 14,000 parts per million calcium and/or magnesium can effectively by exploited by means of the subject process.

Ordinarily, water injection will have been applied to the reservoir first, although this is not a requirement for the employment of this invention. Water injection or water flooding, is, however, a desirable first phase of the recovery program for several reasons. It is less expensive to conduct than the surfactant flooding program, and furthermore, the injection of relatively fresh water into a formation containing connate water having high concentrations of calcium and/or magnesium will result in the lowering of the connate water hardness to a point where a chosen surfactant composition may operate more effectively. We have found that the optimum interfacial tension reduction is not necessarily achieved at the lowest possible total hardness. This is another reason for the desirability that actual experimentation be undertaken utilizing the available formation water or a relatively close facsimile thereof, to determine the optimum surfactant composition and also the optimum hardness and pH at which the chosen composition will function.

In formations wherein it is known or expected that surfactants will be adsorbed from solution onto the formation rock, it is preferable either to provide in a preflush or in the surfactant solution, sacrificial inorganic material such as sodium polyphosphate to prevent surfactant adsorption or to use more than the optimum concentration of surfactant as determined by the capillary tests or other means in order to compensate for adsorption. It is generally satisfactory to use up to 5 percent by weight surfactant, and this surplus material need only be added to the first 10 percent or so of the surfactant slug injected with subsequent portions of the total surfactant solution slug containing lesser amounts of each surfactant. Each surfactant may tend to adsorb onto the formation, or there may be a preferential adsorption of either the sulfonated or phosphate ester surfactant used, depending on the characteristics of the formation rock.

If the viscosity of the petroleum contained in the subterranean formation is sufficiently high, the ratio of viscosities of injected fluid to displaced fluid, or mobility ratio as it is referred to in the art of supplemental oil recovery, will result in an adverse sweep efficiency, and so it is preferable to utilize some type of additive to increase the viscosity of the injected aqueous fluid to more nearly match the viscosity of the subterranean petroleum to ensure good sweep efficiency. Hydrophilic polymers such as polyacrylamides or polysaccharides are effective for this purpose in a concentration from about 50 to about 500 parts per million in an aqueous solution. The use of this amount of polymer results in a fluid having an apparent viscosity of from about 5 to 15 centipoise, depending on the oil viscosity, which will generally improve the mobility ratio to a point that improved sweep efficiency cn be achieved. It may be desirable to add a small concentration of the hydrophilic polymer to the surfactant solution, but it is generally satisfactory to follow the surfactant solution with a mobility buffer which comprises an aqueous solution of the hydrophilic polymer. This mobility buffer itself is then displaced through the formation by injecting water into the formation. Whether or not the mobility buffer solution is used, the final phase of the supplemental oil recovery operation will comprise the injection of water into the formation to displace the surfactant solution and the displaced oil through the formation to the the producing well. Water injection will be continued until the water/oil ratio at the producing well rises to about 30 to 40.

Alternating injection of small slugs of an inert gas such as nitrogen, air, carbon dioxide with water or with the aqueous solution of hydrophilic polymer described above may also be used advantageously after the surfactant flood.

The invention can be more fully understood by reference to the following field example, which is offered only for the purpose of illustration and is not intended to be limitative or restrictive of the invention, which will be defined more precisely hereinafter in the claims.

FIELD EXAMPLE

A subterranean, petroleum-containing limestone formation is found at a depth of 9500 feet. The limestone formation is 40 feet thick and the porosity is 30 percent. The field is exploited first by primary production, utilizing a square grid pattern with 400 foot line spacing between wells. At the conclusion of primary recovery, which recovers only 21% of the petroleum originally in place within the reservoir, injection wells are drilled in the center of each square grid to convert the field to an inverted five spot pattern for water injection. Although a large field entails a multiplicity of the square grid patterns, each 400 feet on a side and with an injection well in the center, it is possible to analyze the performance of the entire field by considering only a single grid unit. Water is injected into the injection well and production of oil is continued from the production wells until the water/oil ratio reaches a value above about 30, which is considered to be the economic limit for continued production. At the conclusion of the water flooding operation, only 42% of the oil originally in place in the reservoir has been recovered, and some form of tertiary recovery operation must be resorted to in order to obtain any significant portion of the remaining petroleum. The formation temperature is 220° F. The formation water is analyzed and found to contain 3000 parts per million calcium and 1000 parts per million magnesium, and the total solids (salinity) is 170,000 parts per million. The pH of the formation water is 5.8. Capillary displacement tests are performed using actual formation water and it is determined that the maximum capillary displacement results from the use of 0.30 percent by weight of the ammonium salt of dodecylbenzene sulfonic acid, 0.20 percent by weight of a phosphate ester surfactant and 0.2 percent by weight of the sulfobetaine. Since the formation is known to adsorb all three surfactants, the first 10% of the surfactant slug will contain 2% by weight surfactant, and the remainder of the slug will contain 0.45 percent of each material. The surfactant solution is prepared in a field brine containing 3000 parts per million calcium 1000 parts per million magnesium with total dissolved solids of about 170,000 parts per million and having a pH adjusted to 5.8.

Since the pattern used results in 70 percent sweep efficiency, the total pore volume swept by injected fluid is $$400 \text{Ft.} \times 400 \text{Ft.} \times 40 \text{Ft.} \times 0.30 \times 0.70 = 1,344,000 \text{ Cu. Ft.}$$

A 10 percent pore volume surfactant slug of 134,000 Cu. Ft. (1,047,000) gallons is used. The first 10 percent of this slug, or 104,700 gallons contains 2 percent by weight of each material. The balance contains 0.4 percent of the anionic surfactant, a dodecyl benzene and sulfonic acid and 0.30 percent of the phosphate ester surfactant and 0.3 percent of the sulfonated betaine. The surfactant solution is followed by injecting 1,000,000 gallons of an aqueous solution containing 250 parts per million of polysaccharide, a hydrophilic polymer, which increases the viscosity of the injected aqueous fluid to about 7 centipoise. Finally, water is injected into the formation to displace the surfactant, thickened water solution, and the displaced oil through the formation toward the production wells. Water injection is continued until the water/oil ratio rises to about 30, at which point the residual oil saturation in the swept area is reduced to 14 percent and approximately 85 percent of the original oil in place is recovered.

EXPERIMENTAL

In order to establish the operablity of this invention, and further to determine the optimum operating conditions of the novel surfactant composition of our invention, the following experimental work was performed.

CAPILLARY DISPLACEMENT TESTS

Capillary (thin tube) displacement tests provide a convenient and accurate method for determining the performance of surfactants in any desired hardness, pH and salinity ranges for the chemical system employed. The tests are performed by filling a number of closed end capillary tubes with crude oil from the particular field being studies, and submerging the capillary tubes horizontally into the desired aqueous phase. In the instance of the subject series of tests, the aqueous phase comprised synthetic formation water plus the surfactant mixture being evaluated. In each instance of displacement of oil by the aqueous phase, a meniscus is formed at the oil-water interface. The only force tending to displace oil from the capillary tube was the force resulting from the difference in specific gravities of the two fluids. This force was offset by the interfacial tension between the oil and formation water. When the surfactant composition was successful in producing a movement in the meniscus, the distance traveled by the menicus in millimeters in a 5 minute exposure interval in the chemical system is recorded, and it is this displacement in millimeters that is recorded. There was essentially no displacement of the meniscus in the instance of capillary tubes submerged in formation water containing no surfactant of any kind, indicating that the interfacial tension between the crude oil and the formation water was too great to permit displacement of the oil from the capillary. The optimum reduction in interfacial tension is indicated by the maximum value of of the displacement observed in the capillary tubes.

The surfactants tested were as follows: The first surfactant, the anionic surfactant, was an ammonium salt prepared from SA 597, a dodecyl benzene sulfonic acid manufactured by Continental Oil Corporation. The phosphate ester surfactant was Wayphos M-100 manufactured by Wayland Division of Philip A. Hunt Corp. This is a mixture of sodium salt of phosphate esters as described earlier in formula, wherein $m$ is 10, R is a nonyl group and there is 55% monester and 45% diester.

The sulfonated betaine was Sulfobetaine CA, an acyl amido ammonium sulfonic acid betaine wherein the liophilic radical is coco amido.

Two surfactant solutions were formulated as follows:

| System I | System II |
|---|---|
| 0.3% Wayphos M-100 | 0.15% Sulfobetaine CA |
| 0.3% SA-597 | 0.15% Wayphos M-100 |
| 0.2% (2000 ppm) Calcium | 0.3% SA 597 |
| 10% Sodium Chloride | 0.2% (2000 ppm) Calcium |
| | 10% NaCl |

Five capillary displacement tests were performed with each system to demonstrate the effectiveness of the dual and three surfactant mixtures at this particular concentration of calcium with the pH varied over the range of 5 to 9 to determine the optimum pH for each system. The data are given in Table I below.

TABLE I

| | Capillary Displacement, mm, at 5 minutes | |
|---|---|---|
| pH | System I | System II |
| 5 | 2.5 | 10.3 |
| 6 | 8.6 | 13.0 |
| 7 | 11.5 | 13.7 |
| 8 | 10.5 | 11.8 |
| 9 | 2.8 | 9.3 |

It can be seen that the dual surfactant system I with the stated hardness and salinity performs best at a pH from about 6 to 8. System II, the three component system containing the sulfonated betaine, was effective over the entire pH range tested, from 5 to 9. Other blends and solution hardness values can be expected to produce optimum responses over somewhat different pH ranges.

No precipitation of the calcium salt of SA-597 nor bacterial attack of either surfactants was observed in the system after several days period.

Thus, we have demonstrated that aqueous solutions of a combination of three surfactants, namely water-soluble salts of an alkyl or alkylaryl sulfonates, phosphate ester surfactants containing arylalkyl groups and sulfonated betaines perform efficiently in hard water systems over a wide pH range whereas either used alone will not exhibit surfactant properties in hard water, and a two component system comprising alkylaryl sulfonate plus phosphate ester are not effective over as wide a pH range as is the three component system. Moreover, the surfactants are temperature stable up to at least 225° F, resistant to bacterial attack, and inhibit scale formation.

While our invention has been described in terms of a number of illustrative embodiments, it is not so limited since many variations thereof will be apparent to persons skilled in the art of supplemental oil recovery without departin from the true spirit and scope of our invention. It is our intention and desire that our invention be limited and restricted only by those limitations and restrictions contained in the claims appended hereinafter below.

We claim:

1. An aqueous surfactant-containing fluid for use in flooding subterranean formations which contain petroleum and water having dissolved therein from 200 to 14,000 parts per million divalent ions comprising calcium, magnesium and mixtures thereof, said formation having a temperature from about 125° F to about 225° F, comprising:

a. from about 0.05 to about 5.0 percent by weight of an anionic surfactant with an average molecular weight not to exceed about 360 having one of the following two formulas:

$$(R-X)\ Y$$

wherein R is an alkyl radical, linear or branched, having from 8 to 14 carbon atoms, X is a sulfonate radical, and Y is sodium, potassium or ammonium, or

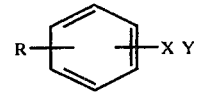

wherein R, X and Y have the same meaning as above;

b. from about .05 to about 5.0 percent by weight of a phosphate ester surfactant with an average molecular weight not to exceed about 1000 having the following formula:

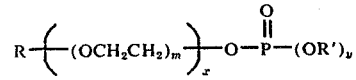

wherein R is alkylphenyl or an alkyl radical having from 12 to 24 carbon atoms, $m$ is an integer between 1 and 20, $x$ and $y$ are 1 or 2 and the sum of $x$ and $y$ is 3, and R' is hydrogen, sodium, potassium or ammonium;

c. from about 0.05 to about 5.0 percent by weight of a sulfonated betaine having the following structure:

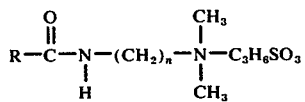

wherein R is an alkyl group having from 12 to 24 carbon atoms and $n$ is an integer from 1 to 5 inclusive; and d. from about 200 to about 1400 parts per million divalent ions selected from the group consisting of calcium, magnesium and mixtures thereof.

2. A fluid as recited in claim 1 wherein the anionic surfactant of (a) is a salt of dodecylbenzene sulfonic acid.

3. A fluid as recited in claim 1 wherein the anionic surfactant of (a) is a salt of tridecylbenzene sulfonic acid.

4. A fluid as recited in claim 1 wherein each of the surfactants is present in a concentration from about 0.2 to about 0.8 weight percent.

5. A fluid as recited in claim 1 which also contains sufficient hydrophilic polymer to increase the viscosity of the fluid.

6. A fluid as recited in claim 1 wherein the pH of the fluid is from 5 to 9.

* * * * *